US008684645B2

(12) United States Patent
Hobbs et al.

(10) Patent No.: US 8,684,645 B2
(45) Date of Patent: Apr. 1, 2014

(54) REMOVABLE GATE

(76) Inventors: Kenneth Hobbs, Yukon, OK (US);
Travis Gorbet, El Reno, OK (US);
Bobby Key, Tuttle, OK (US); Tim Adams, Yukon, OK (US); Craig Starnes, Piedmont, OK (US); William Patchell, Yukon, OK (US)

( * ) Notice: Subject to any disclaimer, the term of this patent is extended or adjusted under 35 U.S.C. 154(b) by 16 days.

(21) Appl. No.: 13/423,731

(22) Filed: Mar. 19, 2012

(65) Prior Publication Data
US 2013/0241227 A1     Sep. 19, 2013

(51) Int. Cl.
*B60P 7/08*       (2006.01)
(52) U.S. Cl.
USPC ............................ 410/142; 410/132; 410/135
(58) Field of Classification Search
USPC ......... 410/130, 132, 133, 134, 135, 137, 138, 410/139, 141, 142; 224/42.33; 296/24.4, 296/37.6; 220/532, 533
See application file for complete search history.

(56) References Cited

U.S. PATENT DOCUMENTS

| | | | |
|---|---|---|---|
| 3,217,664 A * | 11/1965 | Aquino et al. | ................ 410/131 |
| 4,199,297 A | 4/1980 | Abolins | |
| 4,222,149 A | 9/1980 | Holbek | |
| 5,887,928 A | 3/1999 | Fenske | |
| 6,017,175 A | 1/2000 | Kassab et al. | |
| 6,247,740 B1 | 6/2001 | Smith | |
| 6,325,436 B1 | 12/2001 | Ehrenberger et al. | |
| 6,514,022 B2 | 2/2003 | Truckor et al. | |
| 6,923,610 B2 | 8/2005 | Nelson et al. | |
| 7,731,462 B2 | 6/2010 | Squyres et al. | |
| 2005/0036849 A1 | 2/2005 | Kiester et al. | |
| 2009/0218826 A1 | 9/2009 | Elkington et al. | |

FOREIGN PATENT DOCUMENTS

WO     WO 02/061218 A1     8/2002

* cited by examiner

*Primary Examiner* — Stephen Gordon
(74) *Attorney, Agent, or Firm* — McAfee & Taft (57) ABSTRACT

The present disclosure relates to a removable gate for defining storage areas in a transport trailer. The removable gate includes a first elongated housing, a second elongated housing and a pair of supports. Each elongated housing carries a pair of outwardly biased retractable members. When in the extended position the retractable members engage supports thereby securing the gate in a desired position. Retracting the members permits removal and repositioning of the gate. The removable gate is pivotal about the first elongated housing upon retraction of the second pair of retractable members, and pivotal about the second elongated housing upon retraction of the first pair of retractable members.

14 Claims, 8 Drawing Sheets

REMOVABLE GATE

BACKGROUND

Transport trailers typically include configurable devices, such as gates, for defining storage areas in the trailer to transport cargo. Common gates typically require precise alignment, have sharp edges, and have limited configurability. These limitations create difficulty for loading and transporting cargo.

Additionally, common gates typically include multiple heavy connecting components joining gate elements to one another and to the trailer. The weight and size of the components make proper alignment of the connectors difficult for one person. The components and the connectors are susceptible to rattling that can disturb sensitive cargo, such as livestock. Manufacturing tolerances, cargo shift, and other factors can cause the gates to fall out of alignment and make connection and disconnection difficult or impossible. Further, sharp edges on the gates make cargo susceptible to damage during transport. Thus, a need exists for a gate that provides improved configurability, safety, and quiet operation.

SUMMARY

The present disclosure provides a removable gate for defining storage areas in a transport trailer. The removable gate is particularly suitable for use in configuring a trailer to transport livestock.

In one embodiment, the removable gate includes a first elongated housing, a second elongated housing, a pair of supports, a first pair of outwardly biased and retractable members, and a second pair of outwardly biased and retractable members. At least one cross-member secures the first and second elongated housings to one another in a spaced apart configuration. A trailer carries the pair of supports. The first elongated housing carries the first pair of retractable members, and the second elongated housing carries the second pair of retractable members. In the assembled configuration, the first and second pairs of retractable members engage the pair of supports removably securing the removable gate between the supports. The removable gate is pivotal about the first elongated housing upon retraction of the second pair of retractable members.

In another embodiment, the removable gate includes a first elongated housing, a second elongated housing, a pair of supports, a first pair of outwardly biased and retractable members, a second pair of outwardly biased and retractable members, and at least one seat. At least one cross-member secures the first and second elongated housings to one another in a spaced apart configuration. A trailer carries the pair of supports. The first elongated housing carries the first pair of retractable members, and the second elongated housing carries the second pair of retractable members. In the assembled configuration, the first and second pairs of retractable members engage the pair of supports removably securing the removable gate between the supports. The removable gate is pivotal about the first elongated housing upon retraction of the second pair of retractable members. Each support carries at least one seat having a sidewall and a base. The sidewall of the seat defines a mating surface configured to contact a mating surface defined by at least one of the retractable members. The configuration of the mating surface of the seat and the mating surface of the retractable member substantially precludes lateral movement of the retractable member within the seat thereby substantially precluding the generation of vibrational noise.

In yet another embodiment, the removable gate includes a first elongated housing, a second elongated housing, a pair of supports, a first pair of outwardly biased and retractable members, a second pair of outwardly biased and retractable members, at least one seat, a grasping device, and a lock. At least one cross-member secures the first and second elongated housings to one another in a spaced apart configuration. A trailer carries the pair of supports. The first elongated housing carries the first pair of retractable members, and the second elongated housing carries the second pair of retractable members. In the assembled configuration, the first and second pairs of retractable members engage the pair of supports removably securing the removable gate between the supports. The removable gate is pivotal about the first elongated housing upon retraction of the second pair of retractable members. Each support carries at least one seat defining a mating surface configured to contact a mating surface defined by at least one of the retractable members. The configuration of the mating surface of the seat and the mating surface of the retractable member substantially precludes lateral movement of the retractable member within the seat thereby substantially precluding the generation of vibrational noise. The grasping device is accessible exterior to each of the first and second housings and associated with each retractable member for retracting the retractable member. Each housing also includes a locking mechanism suitable for securing the housing's retractable member in a retracted position.

BRIEF DESCRIPTION OF THE DRAWINGS

FIG. 6 is a plan view of an alternative embodiment of the removable gate.

DETAILED DESCRIPTION

The present disclosure provides a removable gate. The removable gate is suitable for use, for example, in defining storage areas in trailers for transporting livestock. However, the present disclosure does not limit the removable gate to any particular application or usage.

Referring generally to the drawings, removable gate 10 includes a first elongated housing 14, a second elongated housing 18, retractable members 26 and a pair of supports 34.

Figure 1:
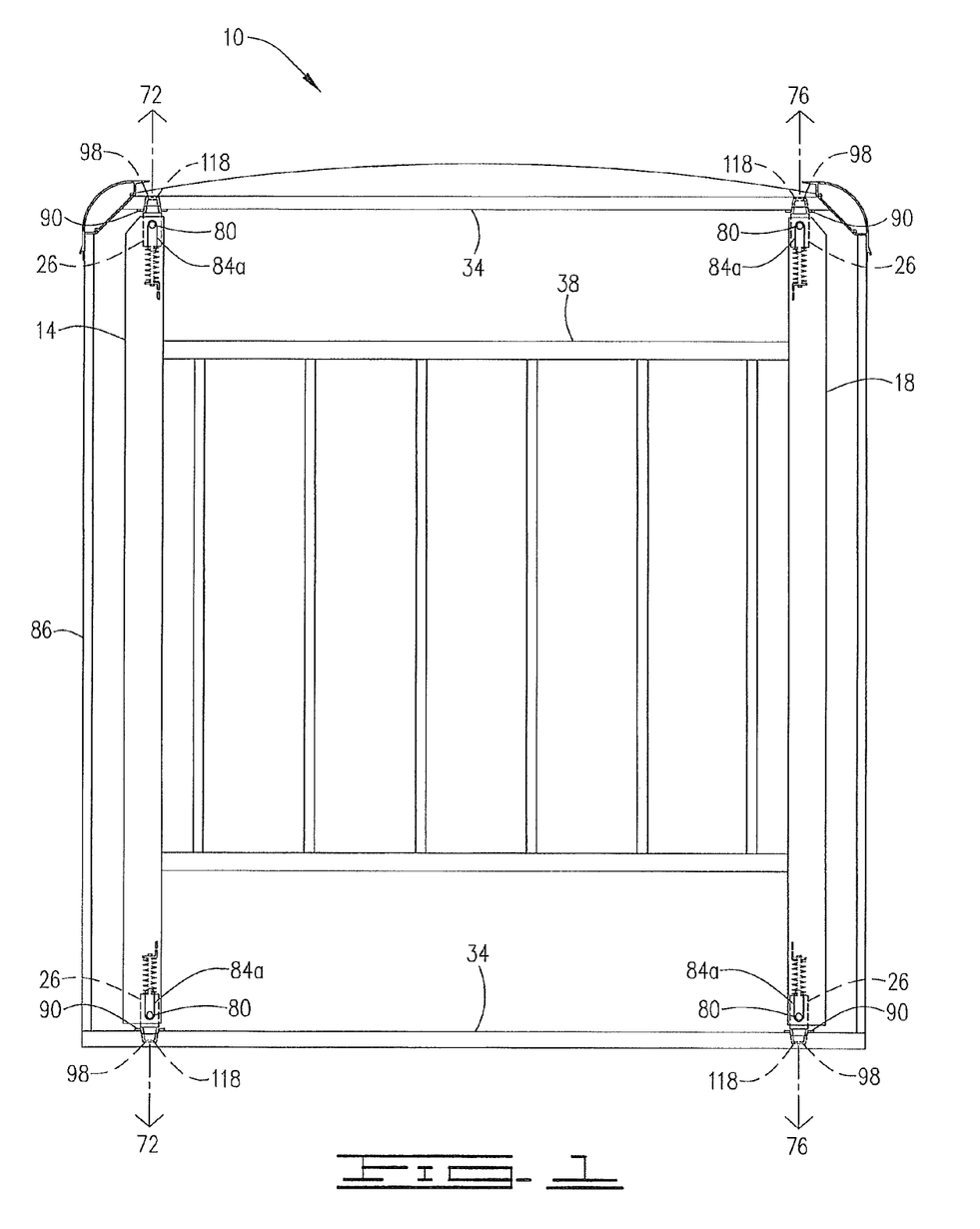
FIG. 1 is a plan view of an embodiment of the removable gate positioned in a trailer.
Figure 2:
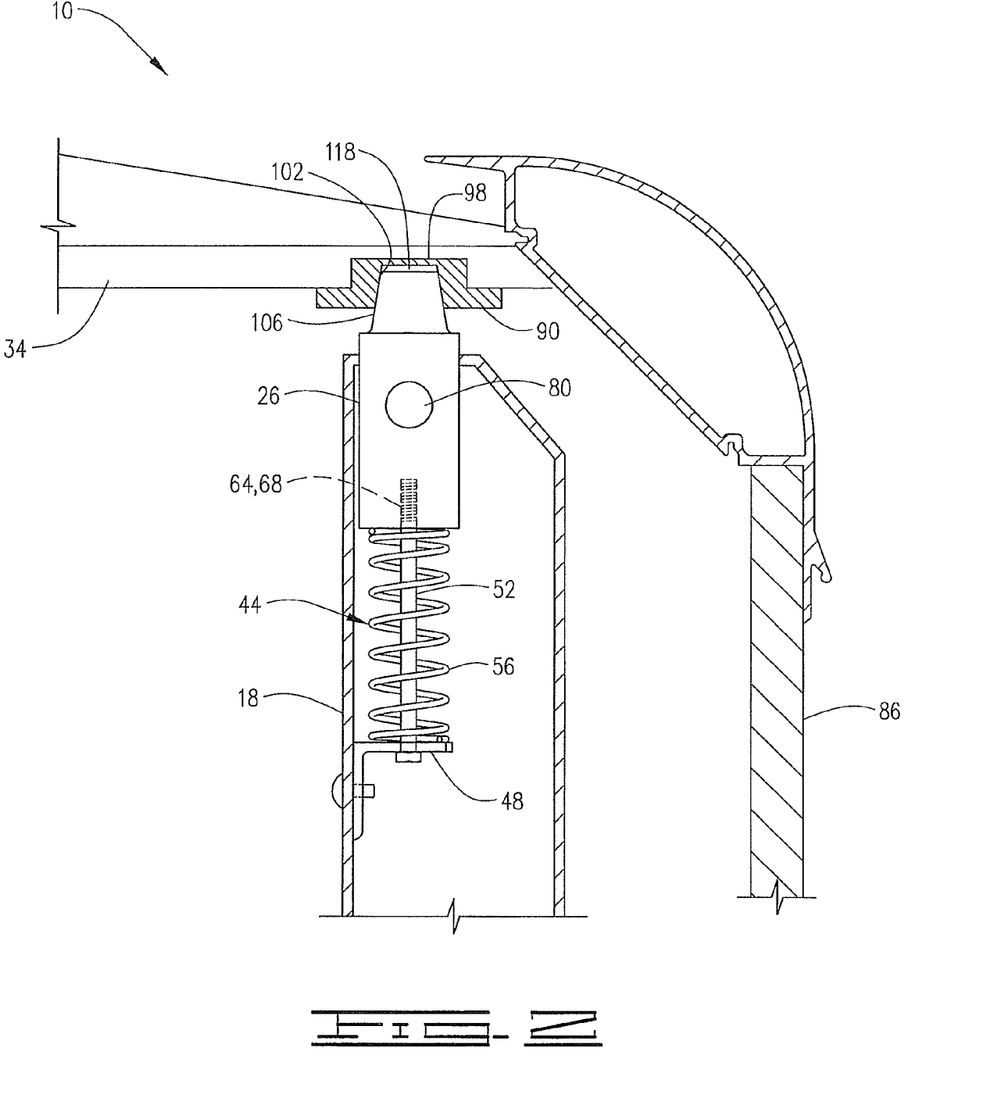
FIG. 2 is a detailed partial cut-away view of the removable gate of FIG. 1, illustrating an elongate housing carrying a retractable member engaged with a support member in the trailer.
Figure 3:
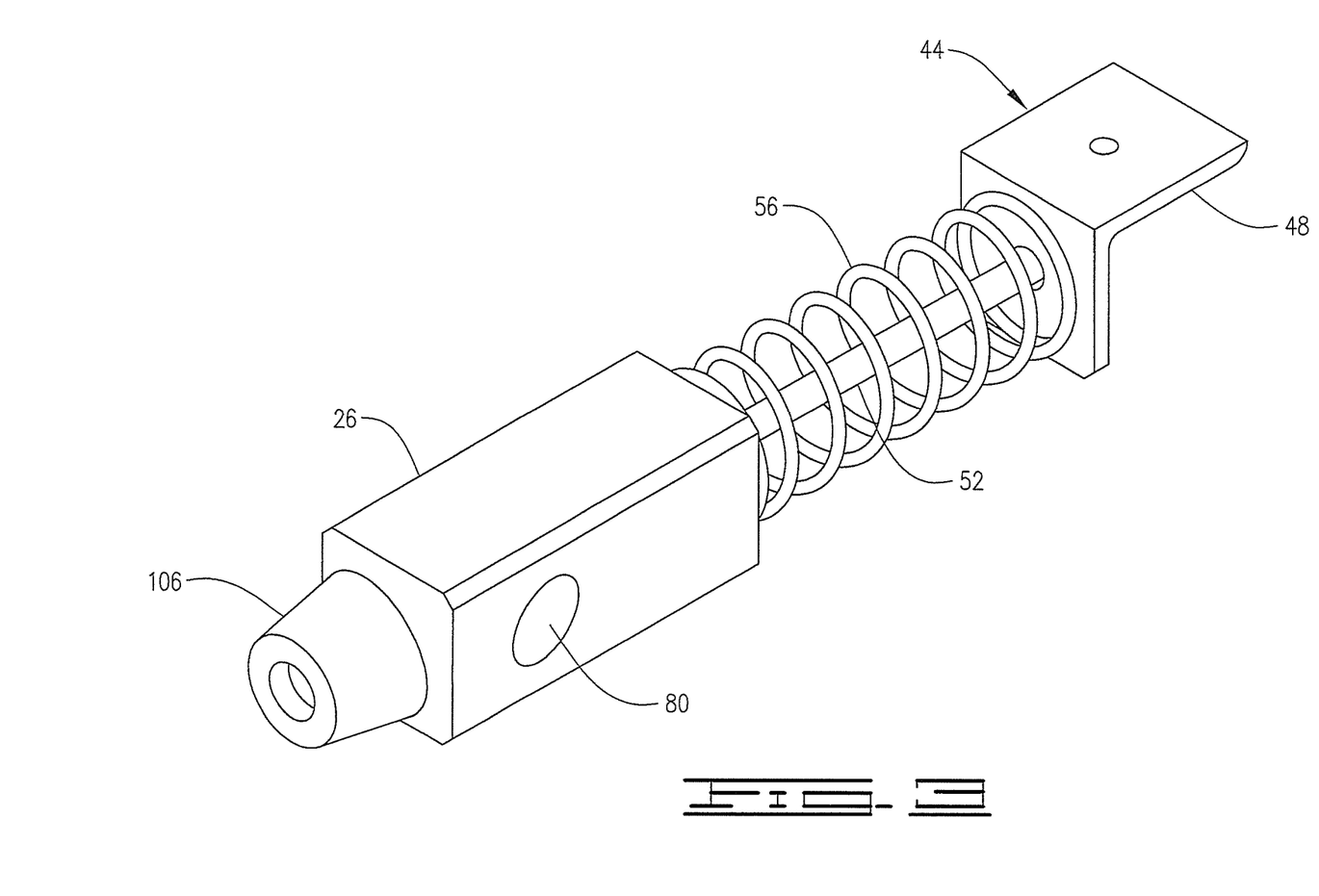
FIG. 3 is a perspective view of an embodiment of a retractable member and biasing assembly.
Figure 4A:
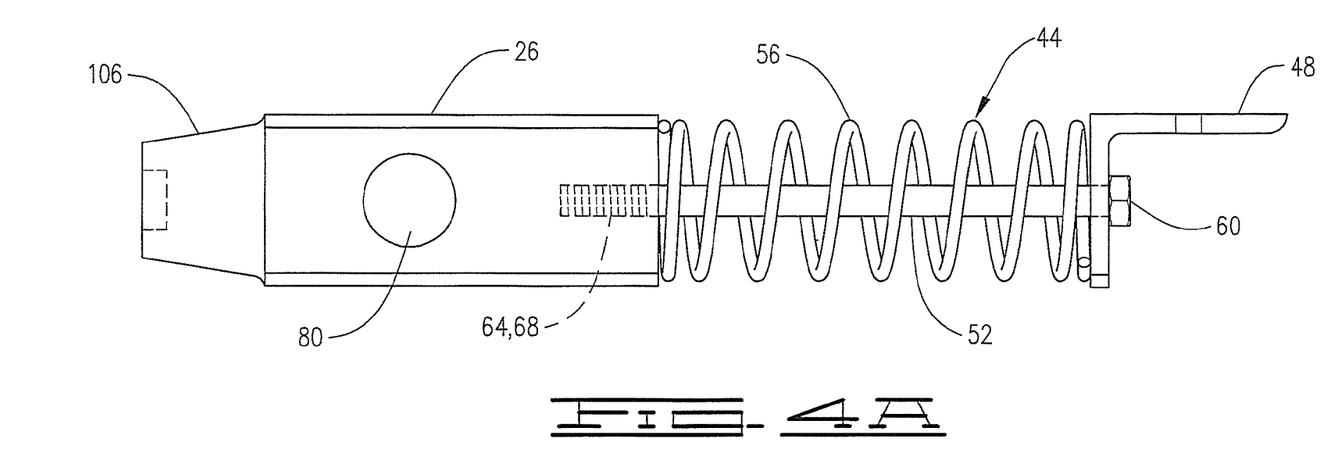
FIG. 4A is a side view of an embodiment of a retractable member and biasing assembly.
Figure 4B:
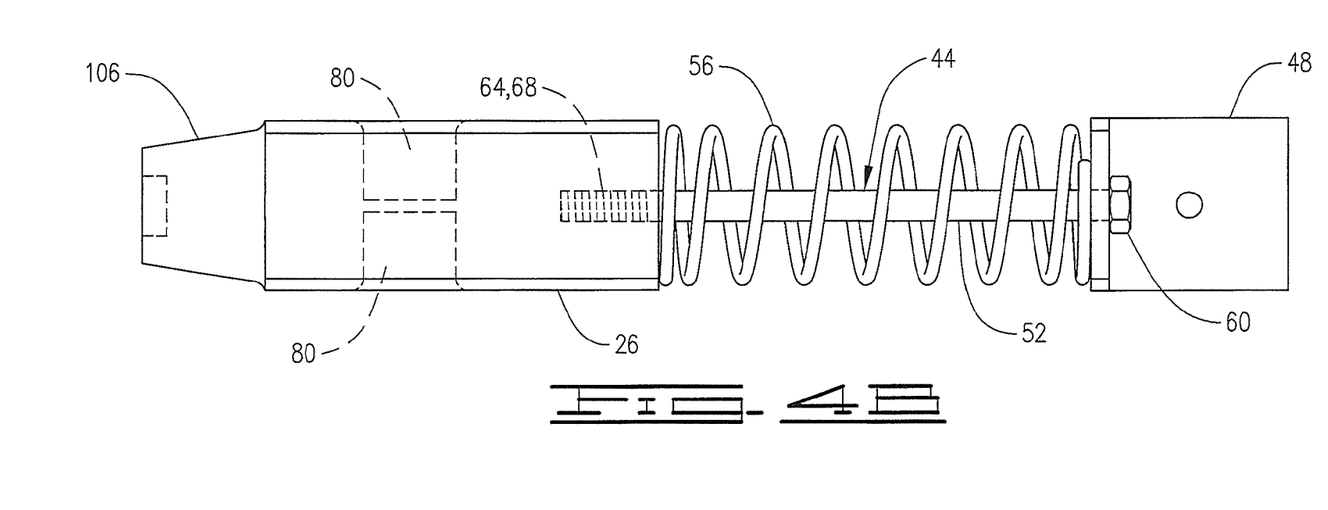
FIG. 4B is a top view of the retractable member and the biasing assembly of FIG. 4A.

As depicted in FIGS. 1-2, first elongated housing 14 and second elongated housing 18 are joined together in a spaced apart configuration by a cross member 38. Cross member 38 joins first and second elongated housings 14, 18 together such that first elongated housing 14 is substantially parallel to second elongate housing 18. Alternative embodiments may include first and second elongated housings 14, 18 spaced apart from one another in a non-parallel configuration.

As shown, first and second elongated housings 14, 18 and cross member 38 are hollow elongate tubes. However, first and second elongated housings 14, 18 and cross member 38 may comprise any suitable shape and material including, without limitation, pipes, rods, and bars, etc.

Continuing with FIGS. 1-2, first elongated housing 14 carries first pair of retractable members 26 and second elongated housing 18 carries second pair of retractable members 26. As shown, retractable members 26 reside in each end of first elongated housing 14 and each end of second elongated housing 18. However, alternative embodiments also contemplate positioning of first and second pairs of retractable members 26 on the exterior of first and second elongated housings 14, 18.

Referring to FIGS. 1-4B, each retractable member 26 is secured to an elongated housing 14 or 18 by a biasing assembly 44. As shown, biasing assembly 44 includes a rod guide 48, a rod 52, and a spring 56. Rod guide 48 provides the mounting point for securing each biasing assembly 44 to elongated housings 14, 18. One end of rod 52 carries a head 60 in the form of a bolt head, nut, or other suitable device for retaining rod 52 in rod guide 48. Each rod 52 also has a threaded portion 64 suitable for securing retractable member 26 to rod 52. In the depicted embodiment, each retractable member 26 has a threaded rod mounting hole 68 to permit attachment to rod 52. Rod 52 is movable in rod guide 48 and along the length of rod 52 between head 60 and retractable member 26.

Alternative embodiments for securing retractable member 26 to rod 52 may include any suitable mechanism. For example, adhesives and press fitting etc. will be appropriate for securing retractable member 26 to rod 52. Further, the present disclosure contemplates alternative embodiments for rod guide 48 and rod 52. For example, each elongated housing 14, 18 may alternately include a track, channel, or keyway, etc. for carrying retractable member 26 in the outwardly biased and retractable configuration described herein.

Continuing with FIGS. 1-4B, rod 52 carries spring 56 positioned between rod guide 48 and the associated retractable member 26 to provide an outward bias to retractable member 26. Alternative embodiments for providing the outward bias of retractable member 26 may include without limitation a leaf spring or hydraulic cylinder positioned between rod guide 48 and retractable member 26.

Referring to FIGS. 1-2, retractable members 26 are outwardly biased and retractable on a first pivotal axis 72 on first elongated housing 14. Similarly, with regard to elongated housing 18, retractable members 26 are outwardly biased and retractable on a second pivotal axis 76. As shown, first elongated housing 14 has each end thereof substantially aligned on first pivotal axis 72, and second elongated housing 18 has each end thereof substantially aligned on second pivotal axis 76. Thus, first and second elongated housings 14, 18 are substantially parallel to first and second pivotal axis 72, 76, respectively. However, the present disclosure does not require that each pivotal axis 72, 76 be parallel to each elongated housing 14, 18.

Referring to FIGS. 1-6, each retractable member 26 may optionally include a grasping device 80, 81. Grasping device 80, 81 is accessible or otherwise operable from exterior to first and second elongated housings 14, 18 for retracting retractable member 26. Grasping device 80, 81 may take any form suitable for engaging or to permit engagement of retractable member 26. Thus grasping device 80, 81 provides the ability to move retractable member 26 against the outwardly biasing force of spring 56. For example, housings 14, 18 may include an access slot exposing a portion of each retractable member 26. The exposed portion of each retractable member 26 may have a recess or hole disposed therein to provide a grasping surface for retracting retractable member 26. Further, a hand held rod or dowel may be inserted into the recess or hole in retractable member 26 to provide leverage for retracting retractable member 26. Alternative embodiments also contemplate retractable member 26 supporting a handle or other device for retracting the retractable member 26.

As shown in FIGS. 1-5B, each retractable member 26 includes a grasping device 80 in the form of a hole or recess in the surface of retractable member 26. Accessible through a slot or other opening 84a in each exterior wall of first and second housings 14, 18, grasping device 80 provides a leverage point for retracting retractable member 26. Engagement of grasping device 80 with an operator's hand or tool and application of pressure opposite of the biasing force of spring 56 allows the operator to move retractable member 26 from the extended to a retracted position, thereby permitting repositioning of removable gate 10.

FIG. 6 depicts an alternative embodiment with grasping device 81 including an extension rod 85 and block 87. Extension rod 85 may be a separate and discrete component secured in any convenient manner to head 60 of rod 52. Alternatively, rod 52 may include an integral threaded portion 52a extending beyond head 60. In either embodiment, block 87 is secured to extension rod 85 or threaded portion 52a thereby providing grasping device 81. As described above with regard to grasping device 80, grasping device 81 also provides a leverage point for retracting retractable member 26. As depicted, grasping device 81 includes a recess 82 accessible through slot or other opening 84b. Engagement of grasping device 81 with an operator's hand or tool at recess 82 and application of pressure opposite of the biasing force of spring 56 allows the operator to move retractable member 26 from the extended to a retracted position, thereby permitting repositioning of removable gate 10. Thus, this embodiment conveniently positions grasping device 81 a distance from retractable member 26 to prevent a user from having to bend down or otherwise strain to reach grasping device 81 for retracting retractable member 26.

Other embodiments for grasping device 80 or 81 can include without limitation pins, rods, ropes, pull-chains, wire, and cords, etc. secured to retractable member 26, 30. Further, grasping device 80 or 81 does not require elongate opening 84a, 84b and may be accessible or otherwise operable from exterior to first and second elongated housings 14, 18 in any convenient manner. The present disclosure also contemplates electronically or pneumatically actuating grasping device 80 or 81 for retracting retractable member 26 from exterior to first and second elongated housings 14, 18.

Further, each retractable member 26 may optionally have a locking mechanism (not shown) associated therewith for locking retractable member 26 in the retracted position. For example, the lock (not shown) may include, without limitation, a pin or other elongate member inserted through the exterior wall of each first and second elongate housing 14, 18 and engaged with retractable member 26 when in the retracted position. In this manner, the pin or other elongate member precludes movement of retractable member 26 relative to first and second elongate housings 14, 18 respectively, thereby locking retractable member 26 in the retracted position.

Referring to FIGS. 1-2, a trailer 86 carries supports 34. The positioning of one support 34 is across from and substantially parallel with the other support 34 in trailer 86. As shown, the floor and the ceiling of trailer 86 each have one support 34. However, opposing walls in trailer 86 may also include supports 34. Further, trailer 86 may include multiple pairs of supports 34. Any suitable material may be used for supports 34 including, without limitation, tubing, pipe, plate, and bar, etc.

Referring to FIGS. 1-5D, each support 34 typically carries at least one seat 90 having a sidewall 94 and a base 98. Sidewall 94 of seat 90 defines a mating surface 102 configured to contact or otherwise engage a mating surface 106 defined by retractable member 26. With gate assembly 10 secured within trailer 86 by positioning retractable members 26 within seats 90, the configuration of mating surface 102 of seat 90 and mating surface 106 of retractable member 26 substantially precludes lateral movement of gate assembly 10. Thus, the depicted embodiment substantially precludes the generation of vibrational noise as trailer 86 travels across a surface. Although depicted as generally round, mating surface 102 of each seat 90 may have, for example, different sizes and shapes corresponding to the exterior configuration of different retractable members 26 in the manner described herein.

Referring to FIGS. 1-2, first and second pair of retractable members 26 carried by housings 14 and 18 engage supports 34 at seats 90 and removably retain removable gate 10 between supports 34. As shown, the positioning of each seat 90 on one support 34 is across from and axially aligned with one seat 90 on the other support 34. Thus, the positioning of one seat 90 on each support 34 is on first pivotal axis 72 and the positioning of another seat 90 on each support 34 is on second pivotal axis 76 when retractable members 26 engage supports 34. Alternative embodiments may include, without limitation, multiple supports 34 carrying multiple seats 90 for retaining removable gate 10 between supports 34 in different positions. Thus, the present invention permits a wide range of adjustable, yet secure positioning of gate assembly 10 within trailer 86.

Figure 5A:
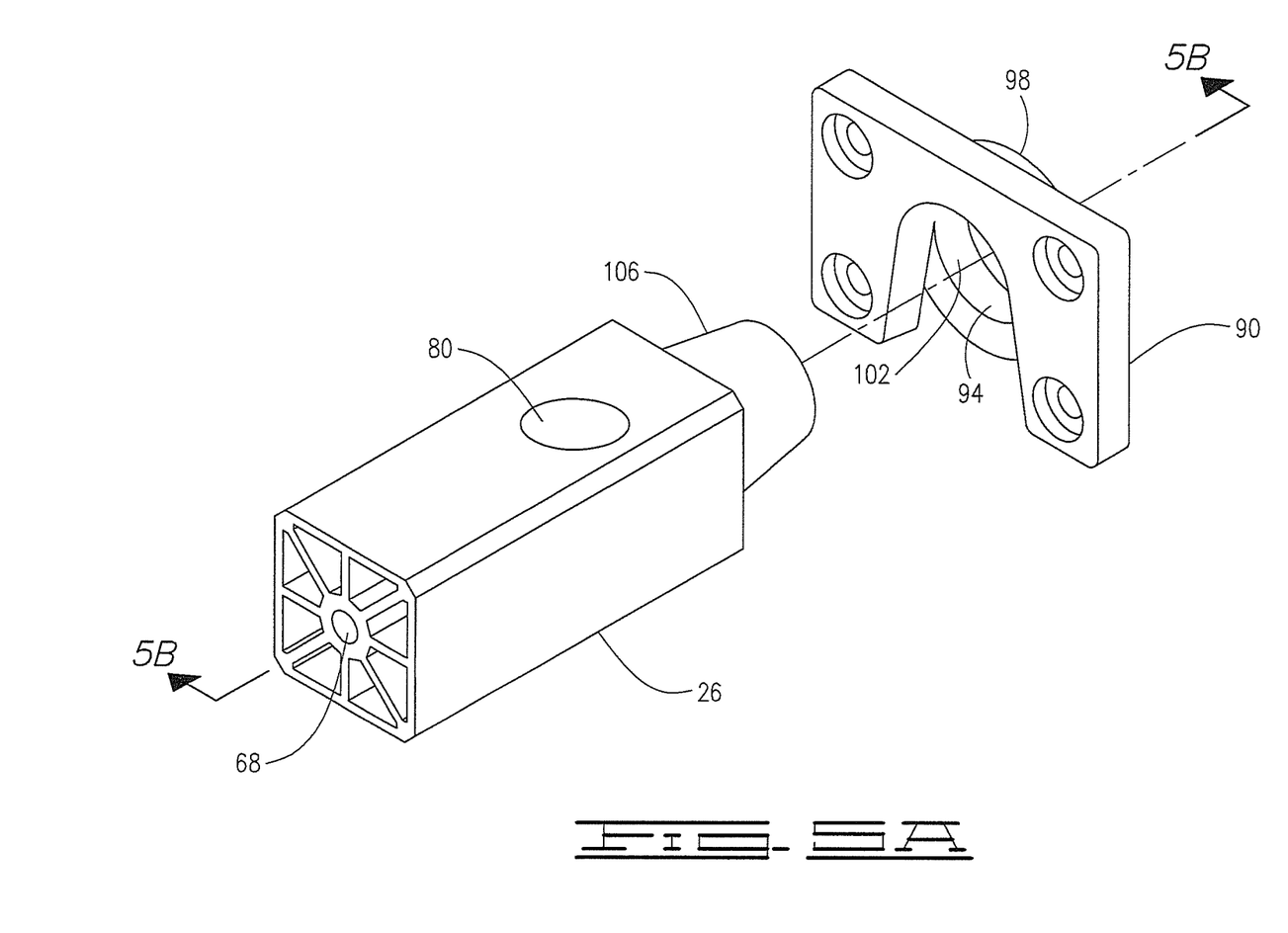
FIG. 5A is a perspective view of an embodiment of a retractable member and a seat.
Figure 5B:
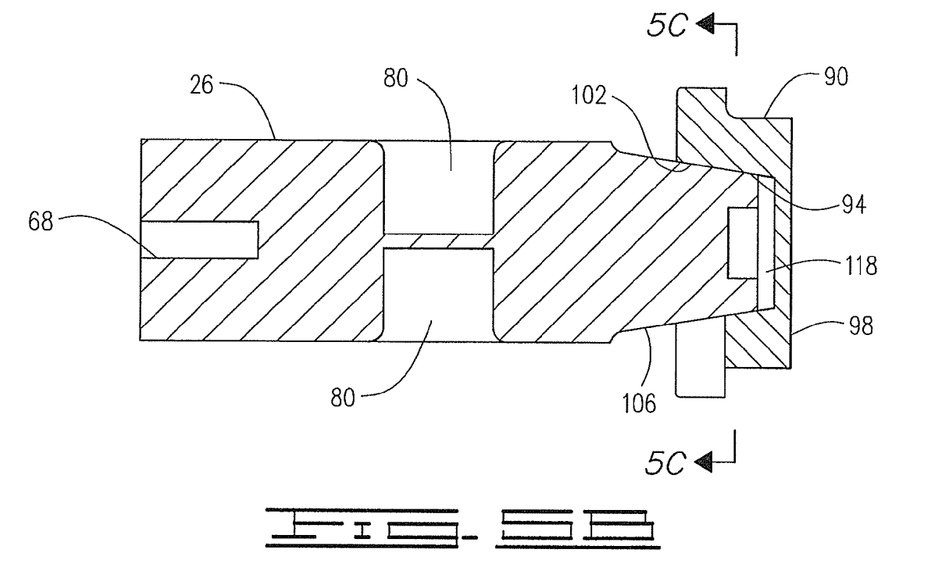
FIG. 5B is a cross-sectional view of FIG. 5A taken at line 5B-5B and depicting the retractable member in contact with the seat.
Figure 5C:
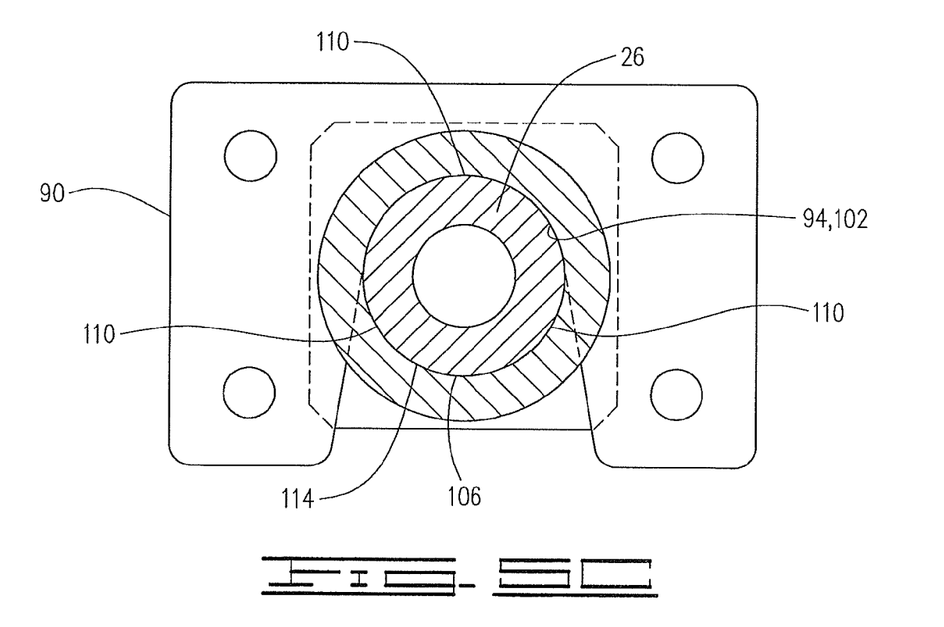
FIG. 5C is a cross-sectional view of FIG. 5B taken at line 5C-5C.
Figure 5D:
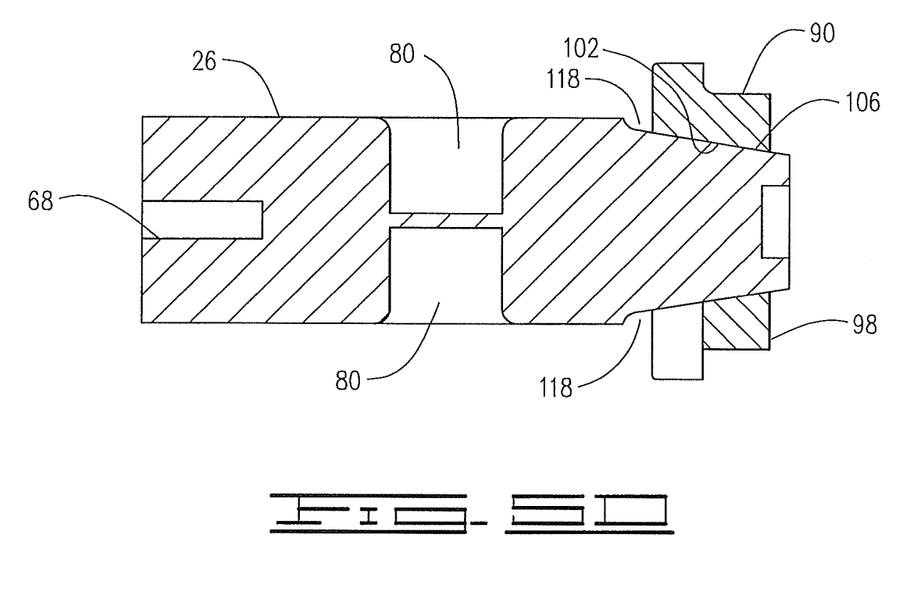
FIG. 5D is a cut-away view of an alternative embodiment of a retractable member in contact with a seat.
Figure 8:
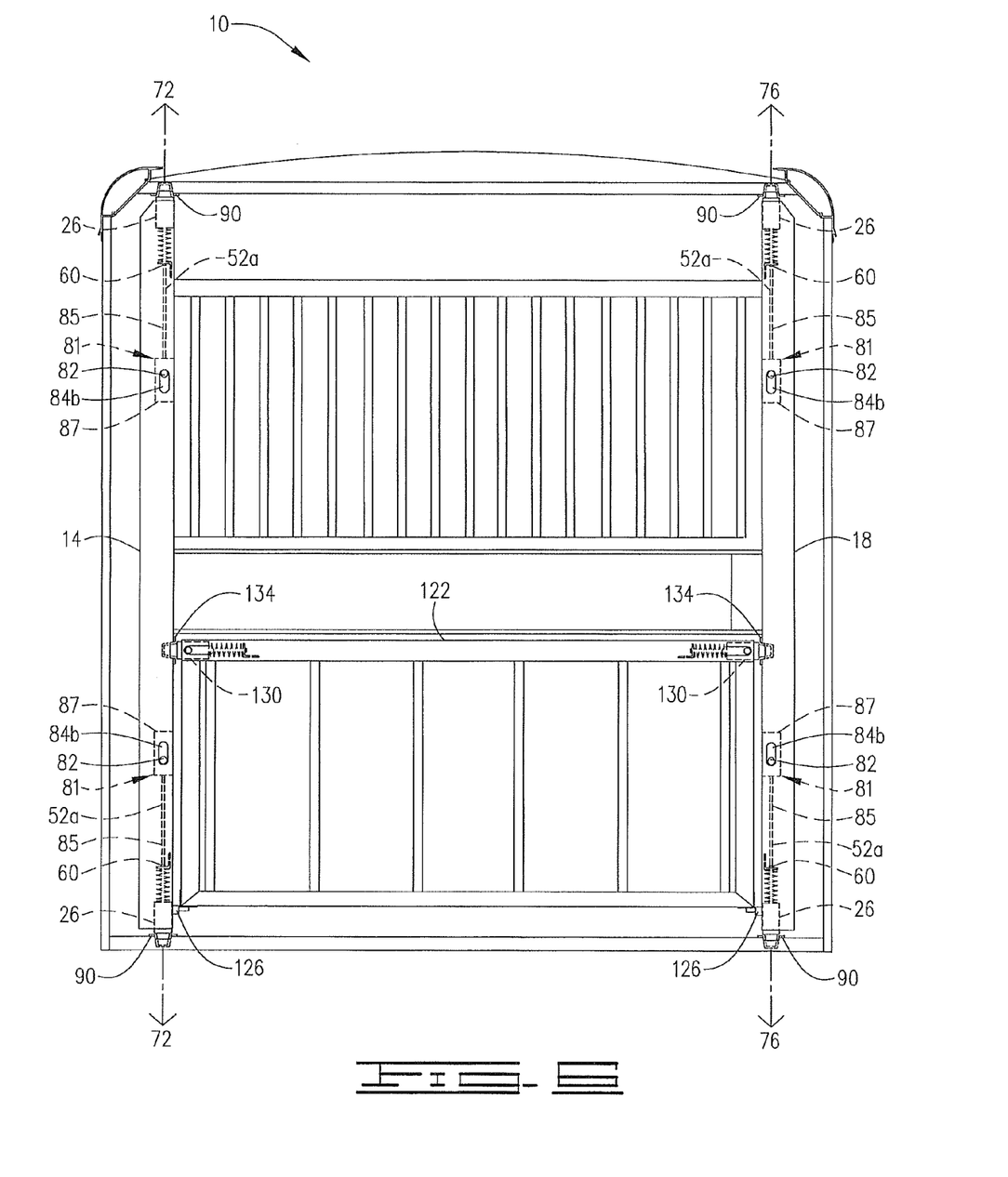

Referring to FIGS. 5A-5D, mating surface 102 and mating surface 106 are nestable. Thus, mating surfaces 102 and 106 laterally contact one another in at least three contact points 110. The spacing of contact points 110 is substantially equidistant about a perimeter 114 defined by mating surfaces 102, 106 when retractable member 26 contacts seat 90. The lateral contact between mating surfaces 102, 106 at contact points 110 substantially precludes lateral movement of retractable member 26 in seat 90. Further, the configuration of mating surfaces 102 and 106 provides a gap 118 between base 98 of seat 90 and retractable member 26 when retractable member 26 contacts seat 90. Gap 118 precludes retractable member 26 from contacting base 98 or otherwise bottoming out on seat 90 thereby maintaining the lateral contact between mating surfaces 102 and 106 at contact points 110. Additionally, in the assembled configuration, each gap 118 helps preclude the generation of noise by avoiding vibrational contact between retractable members 26 and seats 90. FIG. 5D depicts a suitable configuration where base 98 is open in the region of retractable member 26 allowing the tip of retractable member 26 to pass through seat 90 and beyond base 98. As shown in FIGS. 5B-5D, mating surfaces 102 and 106 provide the only contact points between retractable member 26 and seat 90.

As shown, mating surfaces 102, 106 have a frustoconical shape providing a substantially uniform, pivotal contact surface for removably retaining removable gate 10 in trailer 86. Thus, in this embodiment, mating surface 102 of seat 90 and mating surface 106 of retractable member 26 are pivotal relative to one another. Alternative embodiments may include any suitable shape capable of providing the requisite contact between mating surfaces 102 and 106 described herein. One non-limiting example may be a configuration wherein mating surfaces 102 and 106 respectively have female and male non-circular geometric shapes with retractable members 26 being pivotal within housings 14, 18.

In operation, a user positions removable gate 10 between supports 34 as described herein. The aforementioned outward bias of retractable members 26 exerts a constant force on seats 90 positioned in supports 34, thereby removably retaining removable gate 10 between supports 34. Upon retraction of retractable members 26 within housing 18, removable gate 10 is pivotal about axis 72. Further, upon retraction of retractable members 26 within housing 14, removable gate 10 is pivotal about axis 76. In this instance, axis 72 corresponds to housing 14 and axis 76 corresponds to housing 18. Finally, upon retraction of both first and second pairs of retractable members 26, removable gate 10 is removable from trailer 86 as a single unit.

In an alternative embodiment shown in FIG. 6, removable gate 10 includes a pivotal panel 122 positioned between first and second elongated housings 14, 18. Pivotal panel 122 is substantially rectangular in shape, having a width extending between first and second elongated housings 14, 18 and a height extending along the length of first and second elongated housings 14, 18. Pivotal panel 122 has a pivot point 126 positioned at each lower corner thereof for securing pivotal panel 122 in a pivotal manner between first and second elongated housings 14, 18. Pivot points 126 may include, without limitation, pins, bolts, or other suitable devices. Each upper corner of pivotal panel 122 has a retractable member 130 typically identical to the previously described retractable member 26. Each retractable member 130 is outwardly biased and retractable in a manner consistent with that described above with regard to retractable member 26. Retractable member 130 engages elongated housings 14, 18 at a seat 134 typically identical to the previously described seat 90. Upon retraction of both retractable members 130, pivotal panel 122 is free to pivot about pivot points 126.

Other embodiments of the current disclosure will be apparent to those skilled in the art from a consideration of this specification, or practice of the teachings disclosed herein. Thus, the foregoing specification is merely exemplary with the true scope and spirit of this disclosure being defined by the attached claims.

What is claimed is:

1. A removable gate for defining storage areas in a trailer, comprising:
   a first elongated housing;
   a second elongated housing, wherein the first and second elongated housings are joined together and spaced apart from one another;
   a pair of supports carried by the trailer;
   at least one seat carried by each support, wherein the seat has a sidewall and a base;
   a first pair of outwardly biased and retractable members carried by the first elongated housing, wherein the first pair of retractable members are configured to engage the pair of supports;
   a second pair of outwardly biased and retractable members carried by the second elongated housing, wherein the second pair of retractable members are configured to engage the pair of supports, whereby the first and second pairs of retractable members removably retain the gate between the supports; and the seat sidewall defining a mating surface configured to contact a mating surface carried by at least one of the retractable members, and wherein the configuration of the mating surface of the seat and the mating surface of the retractable member have at least three lateral contact points, wherein the contact points are spaced substantially equidistant about a perimeter defined by the mating surfaces when the retractable member is in contact with the seat.

2. The removable gate of claim 1, wherein the first pair of retractable members are outwardly biased and retractable on a first pivotal axis associated with the first housing, and wherein the second pair of retractable members are outwardly biased and retractable on a second pivotal axis associated with the second housing.

3. The removable gate of claim 2, wherein each end of the first elongated housing is substantially aligned on the first pivotal axis and each end of the second elongated housing is substantially aligned on the second pivotal axis.

4. The removable gate of claim 1, wherein the mating surfaces of the seat and the retractable member are nestable.

5. The removable gate of claim 1, wherein the configuration of the mating surface of the seat and the mating surface of the retractable member permits pivotal movement between the seat and the retractable member.

6. The removable gate of claim 1, wherein the mating surface of the seat and the mating surface of the retractable member provide the only direct contact between the seat and the retractable member when the retractable member is in contact with the seat.

7. The removable gate of claim 1, wherein the outward bias of the pairs of retractable members exert a constant force on the supports, thereby retaining the gate between the supports.

8. The removable gate of claim 1, wherein each outwardly biased retractable member is lockable in a retracted position.

9. The removable gate of claim 1, further comprising a grasping device associated with each retractable member for retracting the retractable member, wherein the grasping device is accessible through an opening disposed through an exterior wall of each of the first and second housings.

10. The removable gate of claim 1, wherein the gate is pivotal about the first housing upon retraction of the second pair of retractable members carried by the second elongated housing.

11. A removable gate for defining storage areas in a trailer, comprising:
a first elongated housing;
a second elongated housing, wherein the first and second elongated housings are joined together and spaced apart from one another;
a pair of supports carried by the trailer;
a first pair of outwardly biased and retractable members carried by the first elongated housing, wherein the first pair of retractable members engage the pair of supports;
a second pair of outwardly biased and retractable members carried by the second elongated housing, wherein the second pair of retractable members engage the pair of supports, whereby the first and second pairs of retractable members removably retain the gate between the supports, and wherein the gate is pivotal about the first housing upon retraction of the second pair of retractable members;
at least one seat carried by each support, wherein the seat has a mating surface configured to contact a mating surface defined by at least one of the retractable members, and wherein the configuration of the mating surface of the seat and the mating surface of the retractable member provides at least three lateral contact points, wherein the contact points are spaced substantially equidistant about a perimeter defined by the mating surfaces when the retractable member is in contact with the seat; and
a grasping device associated with each retractable member for retracting the retractable member, wherein the grasping device is accessible exterior to each of the first and second housings.

12. The removable gate of claim 11, wherein the mating surfaces of the seat and the retractable member are nestable.

13. The removable gate of claim 11, wherein the mating surface of the seat and the mating surface of the retractable member provide the only direct contact between the seat and the retractable member when the retractable member is in contact with the seat.

14. The removable gate of claim 11, wherein the seat has a sidewall and a base, the sidewall defining a mating surface configured to contact the mating surface defined by at least one of the retractable members, and wherein the configuration of the mating surface of the sidewall of the seat and the mating surface of the retractable member substantially precludes lateral movement of the retractable member within the seat thereby substantially precluding the generation of vibrational noise.

* * * * *